(12) United States Patent
Nowak et al.

(10) Patent No.: US 6,839,754 B2
(45) Date of Patent: Jan. 4, 2005

(54) NETWORK TOMOGRAPHY USING CLOSELY-SPACED UNICAST PACKETS

(75) Inventors: Robert D. Nowak, Houston, TX (US); Mark J. Coates, Houston, TX (US)

(73) Assignee: WM. Marsh Rice University, Houston, TX (US)

( * ) Notice: Subject to any disclaimer, the term of this patent is extended or adjusted under 35 U.S.C. 154(b) by 51 days.

(21) Appl. No.: 09/952,608

(22) Filed: Sep. 14, 2001

(65) Prior Publication Data

US 2002/0116154 A1 Aug. 22, 2002

Related U.S. Application Data

(60) Provisional application No. 60/232,775, filed on Sep. 15, 2000.

(51) Int. Cl.[7] ............................................. G06F 15/16
(52) U.S. Cl. ........................................ 709/224; 714/48
(58) Field of Search ............................... 714/748–751, 714/48; 709/224

(56) References Cited

U.S. PATENT DOCUMENTS

| | | | | |
|---|---|---|---|---|
| 4,905,234 A | * | 2/1990 | Childress et al. | 714/749 |
| 5,727,002 A | * | 3/1998 | Miller et al. | 714/148 |
| 6,061,725 A | * | 5/2000 | Schwaller et al. | 709/224 |
| 6,076,113 A | * | 6/2000 | Ramanathan et al. | 709/235 |
| 6,151,696 A | * | 11/2000 | Miller et al. | 714/748 |
| RE37,141 E | * | 4/2001 | O'Sullivan | 455/557 |
| 6,496,520 B1 | * | 12/2002 | Acosta | 370/474 |

OTHER PUBLICATIONS

F. Lo Presti, N.G. Duffield, J. Horowitz, and D. Towsley, "Multicast–based inference of network–internal delay distribution," Tech. Rep., Univ. Massachusetts, CMPSCI 99–55, 1999.

R. Caceres, N. Duffield, J. Horowitz, and D. Towsley, "Multicast–based inference of network–internal loss characteristics," IEEE Trans. Info Theory, vol. 45, No. 7, pp. 2462–2480, Nov. 1999.

R. Caceres, N. Duffield, J. Horowitz, D. Towsley, and T. Bu, "Multicast–based inference of network–internal characteristics: Accuracy of packet loss estimation," Proc. IEEE Infocom '99, Mar. 1999.

R. Caceres, N. Duffield, S. Moon, and D. Towsley, "Inference of internal loss rates in the MBone," in Proc. IEEE/ISOC Global Internet, Dec. 1999.

A. Bestavros, K. Harfoush, and J. Byers, "Robust identification of shared losses using end–to–end unicast probes," in Proc. IEEE Int. Conf. Network Protocols, Osaka, Japan, Nov. 2000.

K. Lai and M. Baker, "Measuring link bandwidths using a deterministic model of packet delay," in Proc. ACM Sigcomm 2000, Stockholm, Sweden, Aug. 2000.

N. Duffield and F. Lo Presti, "Multicast inference of packet delay variance at interior network links," in Proc. IEEE Infocom 2000, Tel Aviv, Israel, Mar. 2000.

S. Moon, P. Skelly, and D. Towelsy, "Estimation and removal of clock skew from network delay measurements," in Proc. IEEE Infocom 1999.

(List continued on next page.)

Primary Examiner—David Y. Eng
(74) Attorney, Agent, or Firm—Conley Rose, P.C.

(57) ABSTRACT

This work discloses a unicast, end-to-end network performance measurement process which is capable of determining internal network losses, delays, and probability mass functions for these characteristics. The process is based on using groups of closely-spaced communications packets to determine the information necessary for inferring the performance characteristics of communications links internal to the network. Computationally efficient estimation algorithms are provided.

17 Claims, 3 Drawing Sheets

OTHER PUBLICATIONS

S. Ratnasamy and S. McCanne, "*Inference of multicast routing trees and bottleneck bandwidths using end–to–end measurements*," Proc. Infocom '99, New York, NY, Mar. 1999.

M. Coates and R. Nowak, "*Network Inference from Passive Unicast Measurements*", Tech. Rep. TR–0002, ECE Dept., Rice Univ., Jan. 2000.

M. Coates and R. Nowak, "*Unicast Network Tomography using EM Algorithms*," Tech. Rep. TR–0004, ECE Dept., Rice Univ., Sep. 2000.

V. Paxson, "*End–to–end Internet packet dynamics*," IEEE/ACM Trans. Networking, 7(3):277–292, Jun. 1999.

M. Allman and V. Paxson, "*On estimating end–to–end network path properties*," Proc. Sigcomm, 1999.

K. Lai and M. Baker, "*Measuring Bandwidth*," Department of Computer Science, Stanford University.

K. Harfoush, A. Bestavros and J. Byers, "*Unicast–based Characterization of Network Loss Topologies*," Computer Science Department, Boston University.

* cited by examiner

NETWORK TOMOGRAPHY USING CLOSELY-SPACED UNICAST PACKETS

CROSS-REFERENCE TO RELATED APPLICATIONS

The present application relates to Provisional U.S. Patent Application No. 60/232,775, filed Sep. 15, 2000, and entitled "Unicast Network Tomography Process" by R. Nowak and M. Coates. This provisional is hereby incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

This invention generally relates to systems and methods for characterizing the performance of computer networks. More specifically, this invention relates to a process that provides loss and delay analysis of internal network links using only measurements "at the edge" of the network.

2. Description of the Related Art

Network performance information can be extremely useful, but for most applications it is important that the information be localized. Knowing how portions or individual components of the network are performing is more valuable than generating a global measure of performance. In particular, the ability to identify the performance of localized portions of the network would be useful for a number of increasingly important networking tasks, including Quality of Service (QOS) verification, maintenance, and content delivery optimization.

Quality of Service Verification

It is now common for Internet service providers to offer a variety of service levels to customers. Service level agreements specify performance criteria that the network provider guarantees to satisfy. Such criteria can include the amount of bandwidth made available to the customer and bounds on the maximum delay (which is important for Internet telephony and streaming applications). However, when a customer communicates via the Internet often a significant portion of the network connection is not under the direct control and responsibility of the service provider. If the customer experiences poor performance, it is difficult to determine whether it is due to the service provider's portion of the connection or the Internet at large. The only way to separate these effects and verify service is to assemble network performance information that is localized to the service provider's network. Unfortunately, directly measuring local network performance is very expensive for service providers. Furthermore, no existing techniques allow customers or third-parties to independently collect such information. It would be desirable to provide a method for an independent party to verify the service level without the cooperation of the provider and to provide a cost-effective means by which the service provider can track the performance of their system.

Maintenance and Provisioning

Maintenance of a network is a major portion of the effort involved in owning and operating a network. When the performance of a network is poor, it can be very difficult to isolate the cause of the problem. Sometimes a router is performing sub-optimally; on other occasions, too much network traffic is directed along one path while other paths remain idle. Furthermore, as networks grow in complexity it is often the case that network owners may not be aware of all components in their system, and consequently methods for mapping the topology of a network are critical. It would be desirable to have a way to determine the topology and connectivity of the network, to localize poor performance to individual network components, to rapidly identified faulty components, to optimize routing decisions, and to perhaps even indicate where additional network resources are required. The overall benefit is that maintenance overhead would be significantly reduced.

Content Delivery

Delivery of high-bandwidth content such as video poses a challenging resource-allocation problem. The source of the content must attempt to optimize the quality of content received by all users while minimizing the total network bandwidth that the content distribution consumes. Optimal bandwidth allocation accounts for the local loss-rates and delays in the network connecting the source and users. It would be desirable to have a system that can estimate local network performance and that can inform the content source of the loss rates and delays experienced at individual routers in the network.

Security

Detection of network intrusion or misuse is extremely challenging. Most techniques are in their infancy, but it appears clear that many intrusions can be detected by the abnormal traffic patterns they generate. For example, rapid increases in the correlation of delay behavior in local network neighborhoods can be indicative of denial-of-service attacks. By conducting on-line monitoring of delay and loss behavior, rapid determination of the source of the attack becomes a much more feasible task. A system that can localize pathological network performance to individual components or subnetworks could aid in the early warning and detection of attacks and intrusions.

A system and method that determines network topology and localized performance measurements would preferably be based on "edge" measurements. Edge measurements are measurements made at the source and receivers, i.e. at the "edge" of the communications network. Conducting direct measurements at internal network points to acquire localized information is an expensive and in many cases an impractical task. Because internal routers operate at such high speeds and carry so much traffic, internal measurement demands special-purpose hardware devices dedicated to the collection of the traffic statistics. As the size of the analyzed network increases, the number of measurement devices grows exponentially. The installation and maintenance of these devices are extremely time-consuming and costly exercises. Moreover, organizing the transmission of the statistics that these devices record to a central processor is complicated, and the transmission of statistics consumes additional network resources.

Whilst measurement throughout a network is infeasible, measurement at the edge of the network is a much more tractable and low-cost task. There are far fewer sites at which measurement must be made, and perhaps more importantly, the measurement can often be performed in software. Techniques that rely only on edge-based measurement would allow independent performance monitoring to be performed, because measurement at the edge of the network does not require cooperation from the owner of the network.

In large-scale networks, end-systems cannot rely on the network itself to cooperate in characterizing its own behavior. This has prompted several groups to investigate methods for inferring internal network behavior based on end-to-end network measurements: the so-called network tomography problem. See R. Caceres, N. Duffield, J. Horowitz, and D. Towsley, "Multicast-based inference of network-internal loss characteristics," IEEE Trans. Info. Theory, vol. 45, November 1999, pp. 2462–80; C. Tebaldi and M. West, "Bayesian inference on network traffic using link count data," J. Amer. Stat. Assoc., June 1998, pp. 557–76; S. Vander Wiel, J. Cao, D. Davis, and B. Yu, "Time-varying network tomography: router link data," in Proc, Symposium on the Interface: Computing Science and Statistics, (Schaumburg, Ill.), June 1999; Y. Vardi, "Network tomography: estimating source-destination traffic intensities from link data," J. Amer. Stat. Assoc., 1996, pp. 365–77; "Multicast-based inference of network-internal characteristics (MINC)," gaia.cs.umass.edu/minc; S. Ratnasamy and S. McCanne, "Inference of multicast routing trees and bottleneck bandwidths using end-to-end measurements," in Proceedings of INFOCOM '99, (New York, N.Y.), March. While promising, these methods require special support from the network in terms of either cooperation between hosts, internal network measurements, or multicast capability. Many networks do not currently support multicast due to its scalability limitations (routers need to maintain per group state), and lack of access control. Moreover, multicast-based methods may not provide an accurate characterization of the loss rates for the traffic of interest, because routers treat multicast packets differently than unicast packets.

Accordingly, it would be desirable to provide a network tomography method that does not require special support from the networks and which provides a more accurate characterization of normal network behavior. Such a method would preferably be straightforward to implement and would be scalable.

SUMMARY OF THE INVENTION

We have developed an innovative and cost-effective process called Network Tomography Using Groups of Closely Time-Spaced Packets that produces accurate mappings of network structure and performance. It may provide estimates of losses and/or delays at internal routers as indicators of localized network performance. A key advantage of the process is that it can provide probability distributions for the measured performance parameters. This allows for a more complete characterization of the network behavior by indicating the accuracy and reliability of the measurements.

Broadly speaking, our methods have the potential to infer subnetwork and link-level (individual connections between routers in a large network) packet loss rates, delays, and utilization, as well as network topology. This will provide the complete characterization of network behavior that is necessary for maintenance and service provisioning, as well as Quality-of-Service verification. Another key advantage of our approach is that we do not require cooperation from any of the routers in the network; all inferences are based only on measurement cooperation between senders and receivers.

Our approach may advantageously employ end-to-end measurement of single unicast packets and groups of closely-spaced unicast packets. The measurements can be performed actively or passively. In contrast to multicast techniques, unicast network tomography is straightforward to implement on most networks and is scalable. Unicast methods will also provide more accurate estimates of network behavior, since the traffic in most networks is predominantly unicast in nature. The process may include the application of maximum likelihood estimation, probability factorization, missing data techniques, and message passing algorithms to the problem. These individual techniques are combined and applied in a novel way to enable very efficient and scalable estimation algorithms. In fact, the complexity of our loss-estimation algorithms grows linearly with the number of nodes in the network under study.

In the preferred embodiment, the process includes (i) sending a set of unicast communications packets from a source through the network to multiple receivers; (ii) receiving from each of the multiple receivers receipt information indicating those communications packets which have been successfully received by that receiver, and possibly indicating receive times of the packets; and (iii) determining a performance characteristic for each of multiple communications links in the network solely from the receipt information. The set of unicast communications packets preferably includes closely-spaced packet pairs, along with isolated packets. The time separation between isolated packets and pairs is preferably sufficiently large enough to provide approximate statistical independence, while the spacing of the packets in the pair is preferably small enough to provide very high correlation between the packet measurements. In the determination step, the process includes identifying the network topology, introducing variables for missing data (unobserved parameters) at internal network nodes, constructing a state-space data structure (a factor graph), and applying a message passing algorithm to maximize the likelihood function for the desired performance characteristic.

BRIEF DESCRIPTION OF THE DRAWINGS

A better understanding of the present invention can be obtained when the following detailed description of the preferred embodiment is considered in conjunction with the following drawings, in which.

Figure 1:
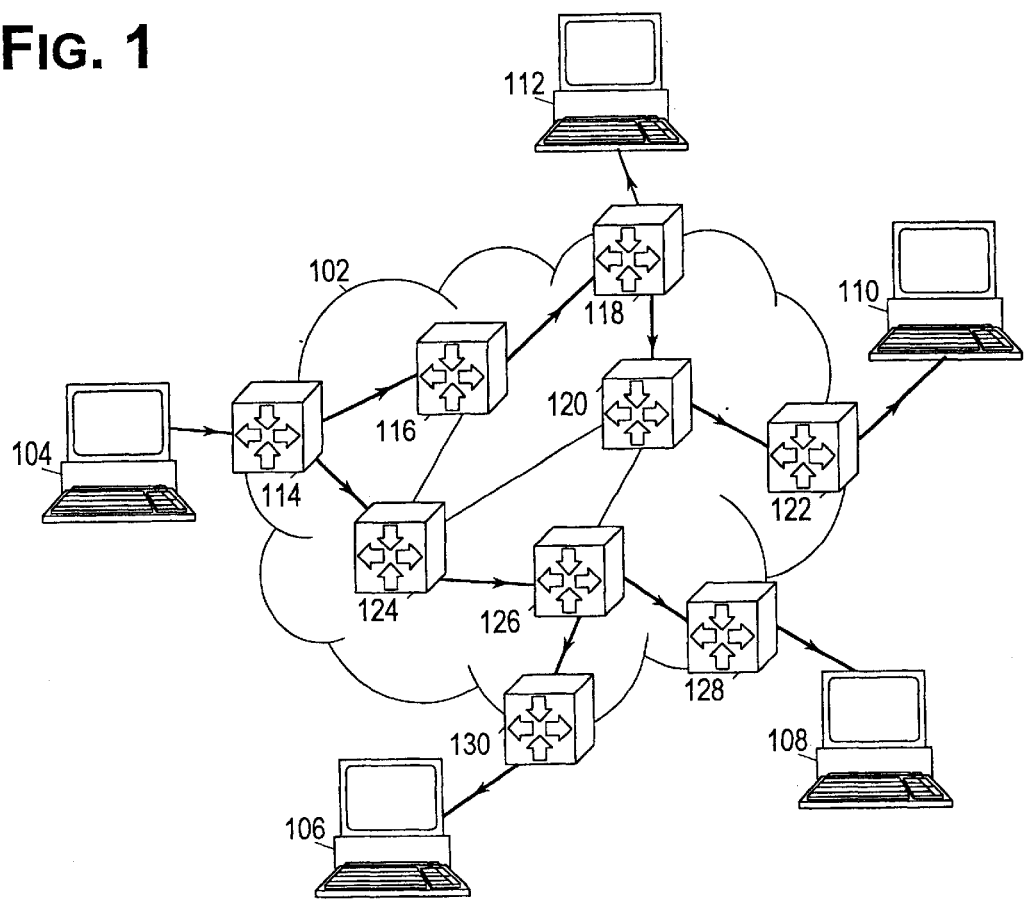
FIG. 1 shows a computer network having multiple routers and internal communications links.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Terminology

Unicast refers to the standard mode of communication in which each information packet is sent from a source to a specific receiver (in contrast to multicast or broadcast where each packet is sent simultaneously to many receivers). Typically, unicast measurements can be made by ISPs (Internet Service Providers) or individual users, and they require no special-purpose network support. Furthermore, they allow passive measurement methods to take advantage of the wealth of information available in existing network traffic (packet probes are not required).

End-to-end measurements refers to traffic measurements collected at host computers or routers at the periphery of the network. No measurements are made at internal routers or nodes in the network.

Back-to-back packet pairs refer to two closely time-spaced packets sent by the source to the same receiver or to different receivers. The two packets are sent one after the other by the source, possibly destined for different receivers, but sharing a common set of links in their paths.

Passive measurement refers to the use of existing network traffic to make the measurements, i.e. the network traffic is not perturbed by the insertion of extra packets for measurement or acknowledgement.

Active measurement refers to the transmission of special purpose packets over the network and using these packets to make the network performance measurements.

DETAILED DESCRIPTION OF PREFERRED EMBODIMENTS

In this paper, we introduce a new methodology for network tomography based on unicast measurement. In contrast to multicast techniques, unicast inference is straightforward to implement on most networks and is scalable. The measurements can be performed actively or passively.

Our approach employs unicast, end-to-end measurement of single packet and back-to-back packet pair losses and/or delays. It uses the collected traffic statistics from edge-based measurements to calculate localized performance information. Our approach reconstructs internal performance and connectivity characteristics by exploiting the correlation between measurements made at different receivers. The algorithm is fast, reliable and cost-effective. It scales to large networks and the accuracy of the results is quantifiable.

Network Tree Structure

Turning now to the figures, FIG. 1 shows a computer network 102 that couples a source computer 104 to multiple receiver computers 106–112. The network 102 is made up of one or more routers 114–130 connected by communications links. The routers accept incoming communications packets from each of the communications links, examine their target addresses, determine the next link in the path to the target address, and retransmit the packets as outgoing communications packets on the appropriate link. The exact routing mechanisms employed by the routers are beyond the scope of the present disclosure. It is sufficient to note that each of the routers typically includes buffers for incoming and outgoing traffic on each of the links. Under heavy traffic conditions, buffers may become full and may even overflow, causing delays and losses of communications packets passing through the routers. Other phenomena may also cause delays and packet losses, but generally the behavior of the buffers predominately determines variations in network performance.

Because it is generally recognized that packet loss occurs, various communications protocols (for example, the Transmission Control Protocol (TCP)) include an acknowledgement mechanism. Generally, a receiver acknowledges the receipt of one or more packets by transmitting a reply packet.

Figure 2:
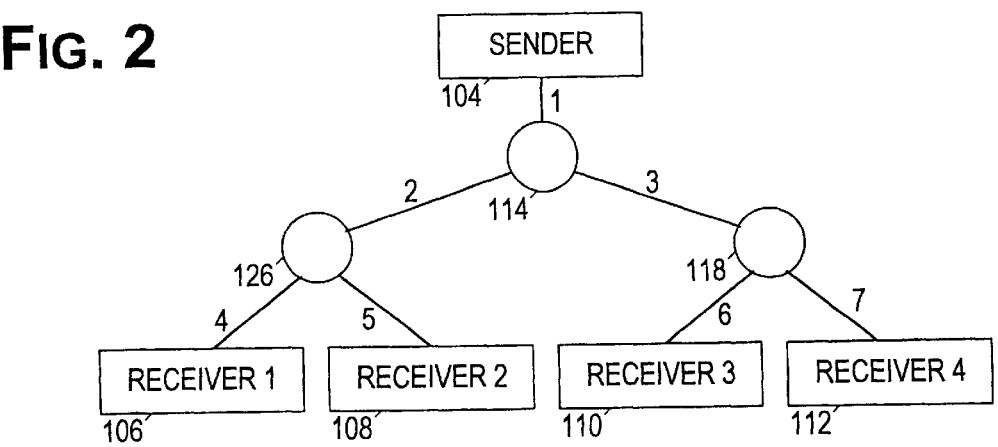
FIG. 2 shows a tree diagram representing the communications path structure of the computer network in FIG. 1.

The set of communications paths between the source computer an the receiver computers at any given time will possess a tree structure. The structure of the tree may vary as routing tables change, but these changes occur relatively infrequently. FIG. 2 shows the tree equivalent of the network shown in FIG. 1. The root of the tree is source computer 104, and the leaves are the destination computers 106–112. The nodes of the tree are routers where communications paths branch. In FIG. 1, branches occur at routers 114, 118, and 126. The links in the tree represent unbranching portions of the communications paths. Accordingly, they represent one or more communications links in the network of FIG. 1, along with any intervening routers. In the preferred embodiment, the tree structure is re-determined periodically to account for any changes in the routing tables of the network routers.

Figure 3:
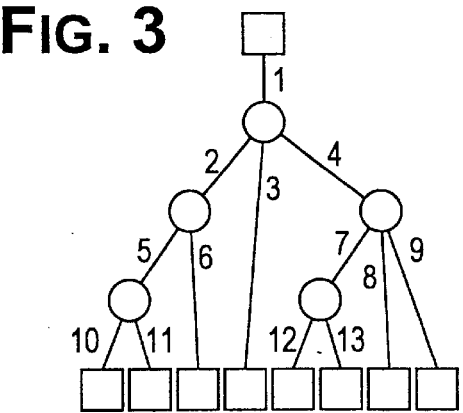
FIG. 3 shows a tree diagram of a more complex computer network.

The tree structure in FIG. 2 is a binary tree. This is coincidental. FIG. 3 shows a more characteristic tree. Each node may have any number of children, and communications path between the source and a receiver may each have any number of links greater than one. The tree of FIG. 3 will be used for illustrative examples hereafter. The links are individually numbered for easy identification.

FIG. 3 depicts an example topology with one source, eight receivers, and thirteen links. Also shown are five internal routers. The problem formulation used herein assumes that network traffic measurements may only be made at the edge. That is, we can determine whether or not a packet sent from the source is successfully received by one of the receivers, and the time when it is received. The formulation also assumes that routing table is fixed for the duration of the measurement process.

Software Architecture

Figure 4:
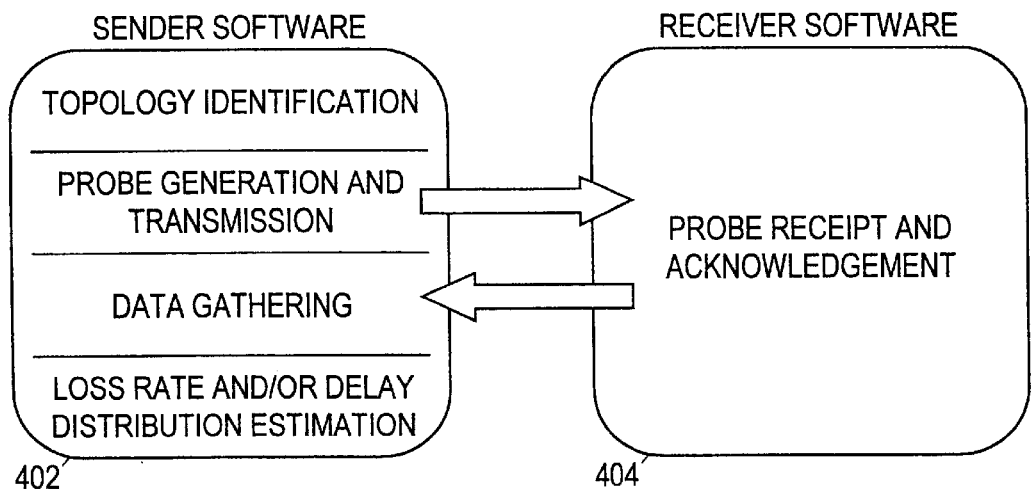
FIG. 4 shows the architecture of a preferred software embodiment.

Before describing the problem formulation in detail, we describe the high-level structure of software that implements the Network Tomography process. FIG. 4 shows two software packages: a sender software package 402, and a receiver software package 404. The receiver software package 404 may be a built-in portion of the network communications protocol, or it may be a small resident program executing on each receiver computer. The receiver software merely ensures acknowledgement of received probe packets. Depending on the desired information, the acknowledgement may simply indicate the successful reception, or it may include a time stamp or other indication of packet travel time. In any event, the receiver package 404 is expected to add little or no overhead to the normal operations of the receiver computers.

Sender software package 402 may include four components that execute periodically. The first component operates to identify the tree topology of the network. The second component generates (for active measurement) or identifies (for passive measurements) packets directed to the receivers. The third component collects the information provided by the acknowledgements from the receiver computers, and the fourth component determines the desired localized network performance measurements from the collected information.

Although the routing tables in the Internet are periodically updated, these changes occur at intervals of several minutes. The measurements made by the software typically occurs on a much shorter timescale, so the topology may be considered static for the duration of the measurements. The topology identification component determines the topology before and after the measurement period to verify that the topology has not changed. In the preferred embodiment, the topology identification is performed using a modified version of "traceroute", a program freely available at ftp.ee.lbl.gov/ traceroute.tar.Z. The topology identification component runs this program once for each receiver to determine the path traversed by packets traveling from the source to the receiver. The path information is then combined to identify the branching nodes and the connections therebetween.

In a contemplated embodiment, the topology identification component includes a monitoring module that monitors the branching nodes that have been identified. If the routing tables are updated at a branching node, the topology is quickly redetermined and the measurement methodology updated accordingly.

The probe generation component, if operating in active measurement mode, preferably requests and establishes TCP connections with each of the receivers to ensure that the receivers are ready to receive packets. Then the component sends UDP probes to each of the receivers. This component may rely on user-specified parameters that indicate a list of receivers, the UDP and TCP ports to use, the total number of probes to send, and the minimum gap between successive probes. Probes are spaced so that successive measurements are approximately independent. The necessary minimum time spacing will be system-dependent, but is expected to be in the range between 100 microseconds and 100 milliseconds. The UDP packet(s) that constitute a probe include fields that contain the packet identification numbers, the time at which the packet was sent, and the index number assigned to the destination(s).

In the passive measurement mode, the source already has numerous contemporaneous connections with a number of receivers. The probe generation component selects as many informative measurements as possible from the existing traffic. Preferably, this component first identifies the important packet-pair measurements (which are less common than the isolated packet measurements). It first inspects the sending times of the traffic at the source and decides that two packets form a packet-pair if their time-spacing is less than a threshold $\delta_t$ seconds. This threshold is dependent on the sending rate of the source. Commencing at the start of the measurement period, the component scans forward in time, seeking and identifying the first packet-pair. It then steps forward by a fixed time interval $\Delta_t >> \delta_t$ and begins searching for the next pair. In this way, the pairs included in the analysis are all separated by a reasonable time interval, making the assumption of statistical independence between pairs more realistic. Following the collection of these pairs, the probe generation component identifies any isolated packets that do not violate the time separation requirement. In general, the number of such packets is significantly larger than the number of pairs.

This packet identification scheme is very fast. However, some pairs may be more informative than others, i.e. those pairs having packets going to different receivers ("cross-pairs") are rarer than those with packets going to the same receiver. Accordingly, a variation of the identification technique begins by identifying all cross-pairs and including the maximal set that does not violate the $\Delta_t$ separation requirement. After the set of cross-pairs has been finalized, the "auto-pairs" (pairs with both packets destined for the same receiver) are identified and included, excepting those that violate the $\Delta_t$ time-separation criterion with the pairs already included. Finally, single (isolated) packets are included, again maintaining the $\Delta_t$ time-separation. This variation typically provides more informative statistics from a given set of traffic data, and may reduce the measurement time duration required for accurate loss inferences.

A more aggressive approach to obtain more informative data could involve alternative session servicing strategies at the source. For example, instead of a basic round-robin service strategy, the source could employ a scheme that would enhance the chances of cross-pairs occurrences, without necessarily deviating from current network protocols.

The receiver software 404 may be a light-weight network client that is executed on all receivers during (active) measurement periods. The receiver listens for TCP connections from the source, and once a connection is established, it begins to accept UDP packets from the sender. As each UDP probe is received, it is timestamped with the local system time and then transmitted via a TCP socket back to the source. TCP is used for the acknowledgement of probes in order to guarantee that no losses occur on the reverse path. In this manner, the software isolates forward path loss statistics. The receiver program has been implemented in Java, and ported it to C for Solaris, Linux, and Windows (via winsock). These various implementations allow the receiver software to easily run on many of the different types of hosts that are connected to the Internet.

The source software 402 maintains two separate logs of the experiment: one for the probe transmission statistics, and one for the reception statistics from the receivers. During measurement, the data collection component listens on the TCP connections, generating a file containing information on all the packets that were echoed by the receivers. The performance measurement component compares the two logs and determines the performance statistics therefrom.

Formulation for Loss Measurement

We begin by stipulating link performance measurement (s). Although a variety of performance measurements may be determined using the techniques disclosed herein, we select packet loss rates and packet queuing delays as most indicative of network link performance. Other possible measures include utilization percentages and bandwidth availability.

Throughout this document, when dealing with network packet loss rates we will use "success" probabilities (i.e. probability of non-loss) instead of loss probabilities. This provides a more convenient mathematical parameterization of the problem, and the probability of loss is simply one minus the probability of success.

The basic idea for the inference of internal packet loss rates or delay characteristics is quite straightforward. Suppose two closely time-spaced (back-to-back) packets are transmitted from a sender to two different receivers. The paths to these receivers share a common set of links from the source but later diverge. Because closely time-spaced packets on a link are likely to encounter the same conditions, the probability that one packet successfully traverses the link given that the other packet has successfully traversed the link is near unity. This observation has bee verified experimentally in real networks (See V. Paxson, "End-to-end Internet packet dynamics", IEEE/ACM Trans. Networking, vol. 7, June 1999, pp. 277–92.) and can also be established theoretically under an M/M/1/K queue model. In our experiments, we are able to obtain accurate loss estimates even in cases where the conditional success probabilities are significantly less than one (e.g., conditional success probabilities of 0.9, which are much lower than a typical measurements on the Internet).

If one of the packets is dropped and the other successfully received, then (assuming shared fates on shared links) one can infer that the packet must have been dropped on one of the unshared links. Similarly, the two packets should experience the same delay on shared links in their paths. This enables the resolution of average delays on individual links. In fact, the topology of a network can also be identified from packet pair measurements by studying the covariance between losses and/or delays to different receivers.

Given a collection of packet pair measurements, we can compute maximum likelihood estimates (MLEs) of localized network performance parameters. The MLEs are simply defined as the parameter values that make the observed packet pair measurements most likely, in a statistical sense. We have developed a numerical optimization technique based on the Expectation-Maximization Algorithm, Bayesian Analysis, and Graphical Statistical Models to compute the desired MLEs very efficiently. The computational cost of the algorithm grows linearly in proportion to the number of links in the network (rather than growing exponentially, for example). The linear complexity of the algorithm is beneficial because it guarantees that the entire Network Tomography process is scalable to very large networks.

Loss Model

Beginning with individual packet transmissions, we assume a simple Bernoulli loss model for each link in the network. That is, each of the individual packet transmission events on link i are independent of each other with a success probability of $\alpha_i$. The probability of a lost packet on link i is $1-\alpha_i$. The loss processes of the separate links are assumed to be independent, so that the probability of success on one link does not affect the probability of success on any other links.

Suppose that the source sends $n_i$ packets to receiver i, and that of these, only $m_i$ packets are received. The likelihood of this result is $$l(m_i \mid n_i, p_i) = \binom{n_i}{m_i} p_i^{m_i} (1-p_i)^{n_i-m_i}$$

where $p_i = \Pi_{j \in P(i)} \alpha_j$, with P(i) being the set of links in the path from the source to receiver i. As an example, if the leftmost receiver in FIG. 3 is receiver 1, then P(1)={1, 2, 5, 10}, and $p_i = \alpha_1 \alpha_2 \alpha_5 \alpha_{10}$.

Moving now to closely-spaced packets, we assume a Markovian model of packet loss. that is, the probability of successful transmission of either individual packet on link i is $\alpha_i = Pr\{success\}$, and the probability of successful transmission of the second packet on link i, given that the first packet successfully traversed link i is $\beta_i = Pr\{\text{2nd success} \mid \text{1st success}\}$.

The 1st and 2nd in the above definition refer to the temporal order of the packets. As an alternative, we can also work with the conditional success probability of the first packet given that the second packet successfully traversed link i:

$\gamma_i = Pr\{\text{1st success} \mid \text{2nd success}\}$

This latter approach may be preferable in most cases, as it can be shown that $\gamma_i$ begins at one and converges to $\alpha_i$ as the interval between the transmission time of first and second packets increases. Although the collected statistics differ, the resulting formulas are basically the same in either approach. Hereafter, we will use the latter approach.

Suppose that the source sends a large number of back-to-back packet pairs in which the first packet is destined for receiver i and the second for receiver j. We assume that the timing between pairs of packets is considerably larger than the timing between two packets in each pair. Let $n_{ij}$ denote the number of pairs for which the second packet is successfully received at node j, and let $m_{ij}$ denote the number of pairs for which both the first and second packets are received at their destinations. Furthermore, let $S(i,j)=P(i) \cap P(j)$ be the set of links common to both paths to receiver i and receiver j, and let $R(i,j)=P(i)-S(i,j)$ be the set of unshared links in the path of the first packet. For example, if the leftmost two receivers in FIG. 3 are denoted 1 and 2, then S(1,2)={1, 2, 5}, and R(1,2)={10}. Using this notation, the likelihood of $m_{ij}$ given $n_{ij}$ is $$l(m_{i,j} \mid n_{i,j}, p_{i,j}) = \binom{n_{i,j}}{m_{i,j}} p_{i,j}^{m_{i,j}} (1-p_{i,j})^{n_{i,j}-m_{i,j}},$$

where $p_{i,j} = \Pi_{q \in S(i,j)} \gamma_q \Pi_{r \in R(i,j)} \alpha_r$.

To use the likelihood formulas given above, we preferably make an assortment of single packet and back-to-back packet measurements distributed across all of the receivers. (Although single-packet statistics may also be determined from the back-to-back packet measurements, e.g. by ignoring one of the packets in each packet pair, more information can be gathered in a shorter amount of time by also considering single packets.) Accordingly, let us represent the set of collected measurements using $M \equiv \{m_i\} \cup \{m_{i,j}\}$ and $N \equiv \{n_i\} \cup \{n_{i,j}\}$, where the index i runs over all the receivers, and the indices i,j run over all pairwise combinations of the receivers. Similarly, let us represent the set of link success probabilities using $A \equiv \{\alpha_q\}$ and $\Gamma \equiv \{\gamma_q\}$. Then the joint likelihood of the set of collected measurements is $l(M \mid N, A, \Gamma) = \Pi_i l(m_i \mid n_i, p_i) \Pi_{i,j} l(m_{i,j} \mid n_{i,j}, p_{i,j})$.

Since M and N are known from measurements, the joint likelihood is a function of the unknown link success probabilities A and $\Gamma$. Determining the link success probabilities that maximize the joint likelihood function is known as maximum likelihood estimation. This is denoted $$(\hat{A}, \hat{\Gamma}) = \underset{A, \Gamma}{\operatorname{argmax}} l(M \mid N, A, \Gamma).$$

If the desire is primarily to determine the unconditional success probabilities A, then integration can be used to eliminate the "nuisance" parameters:

$$\hat{A} = \underset{A}{\operatorname{argmax}} \int l(M \mid N, A, \Gamma) d\Gamma$$

This approach, called Maximum Integrated Likelihood Estimation, may offer increased estimation accuracy for the desired parameters. This technique can be extended to determine a marginal likelihood for each parameter. The marginal likelihood for a given link success probability $\alpha_l$ is $l(M \mid N, \alpha_l) = \int l(M \mid N, A, \Gamma) d\Gamma d\alpha_{\bar{l}}$, where the term $d\alpha_{\bar{l}}$ indicates that the integration is taken over all success probabilities A except $\alpha_l$. A similar marginal likelihood expression can be written for each conditional link success probability $\gamma_l$. The marginal likelihood functions have only one variable, and they may be maximized with respect to that variable to obtain an estimate of the corresponding network parameter.

Algorithm Development for Loss Estimation

Due to the coupled, multidimensional nature of these expressions, directly calculating the estimates can be a computationally intensive task. One technique that significantly reduces the required computational effort introduces "unobserved" variables. Properly chosen, these unobserved variables can de-couple the effects of the other variables, thereby simplifying the individual calculations.

To introduce the notion of unobserved data, let us consider the likelihood $$l(m_i \mid n_i, p_i) = \binom{n_i}{m_i} p_i^{m_i} (1-p_i)^{n_i - m_i},$$

where, as before, $p_i = \Pi_{j \in P(i)} \alpha_j$. Assuming that the path consists of more than one link, note how the effects of the individual link success probabilities on this measurement are combined through the product $p_i$ over the entire path. However, suppose it were possible to measure the numbers of packets making it to each node. Let us denote these unobserved measurements by $u_{j,i}, j \in P(i), j \neq i$. With these measurements in hand, we can write the data likelihood function as $$l(u_{j,i} \mid u_{\rho(j),i}, \alpha_j) = \binom{u_{\rho(j),i}}{u_{j,i}} \alpha_j^{u_{j,i}} (1-\alpha_j)^{u_{\rho(j),i} - u_{j,i}},$$

where $\rho(j)$ denotes the link preceding j in P(i). For the first link in P(i), $u_{\rho(j),i} = n_i$, and for the last link, in P(i), $u_{j,i} = m_i$. The back-to-back likelihood function can be similarly rewritten, and this allows us to express the joint likelihood function as a product of univariate functions. When written in terms of observed and unobserved variables, these functions are herein referred to as the "complete data" likelihood.

Factor Graph Inference

Various optimization strategies may be used to maximize the complete data likelihood function. One strategy is to use factor graphs and marginal analysis. This strategy is based on graphical representations of statistical models. Such representations include Bayesian networks and, more generally, factor graphs. Both the parameters of interest and the collected data appear as nodes in the factor graph. Each node associated with a parameter is characterized by a (potentially unknown) probability distribution (this is the marginal likelihood function described above). Links between nodes indicate probabilistic dependencies. By introducing unobserved variables as additional nodes, it is possible to decouple the effects of different success probabilities in the graphical model.

Probability propagation can be used to perform exact inference, provided the graph structure is acyclic. However, this may require high-dimensional summations, leading to a heavy computational burden. In general, exact inference algorithms may scale poorly as the network size increases. Approximate inference strategies may perform somewhat better.

Figure 7:
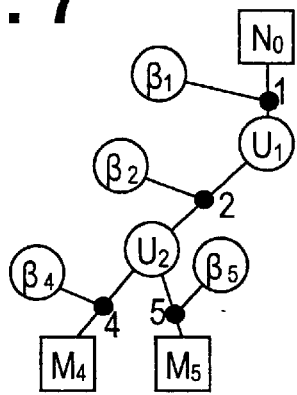
FIG. 7 shows a first factor graph loss estimation in the network of FIG. 2.

We propose an efficient iterative procedure to estimate the marginal likelihoods of the network loss parameters. The procedure makes use of the (theoretically) most informative measurements first. The procedure first forms estimates of the marginal distributions of the $\beta$ parameters. FIG. 7 shows a partial factor graph for the network of FIG. 2. The source packet count is $n_0$, and the packet counts received by receivers 1 and 2 are $m_4$ and $m_5$, respectively. The unobserved packet counts at the branching nodes are $u_1$ and $u_2$. The conditional success probabilities $\beta$ for the links are also included. This graph is used to estimate marginal likelihood distributions for $\beta_4$ and $\beta_5$, the links to the leaf nodes of the left subtree. In performing this estimation, only $\beta$ parameter measurements are used. At any stage in the procedure, summation is performed over a maximum of two dimensions.

Figure 8:
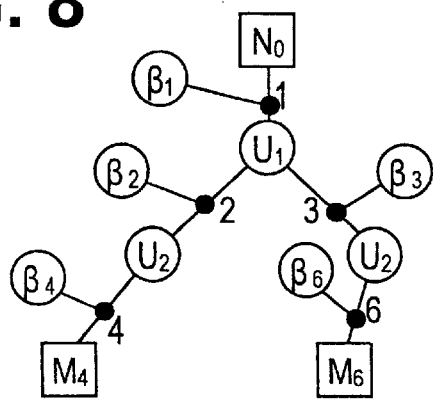
FIG. 8 shows a second factor graph for loss estimation in the network of FIG. 2.

FIG. 8 shows the factor graph used to infer the $\beta$ parameters at the next level in the tree ($\beta_2$ and $\beta_3$). In this stage we only use the measurements that involve no $\alpha$ parameters (i.e. the auto-pairs) and traverse the two most reliable paths that pass through node the branching node. These paths can be readily determined from inspection of the measurements. In this stage, the estimated leaf $\beta$ marginals are used as prior distributions in the message-passing algorithm. Again, two-dimensional summation is the worst case at any node.

The procedure for estimation of the $\alpha$ parameters follows the same pattern. The leaf parameter marginals are estimated first (using appropriate estimated $\beta$ marginals) and then these estimated marginals are used to perform inference of $\alpha$ parameters further up the tree. Further details on the use of factor graphs may be found in B. Frey, *Graphical Models for Machine Learning and Digital Communication*, MIT Press, Cambridge, 1998, which is hereby incorporated by reference.

Expectation Maximization Inference

Another strategy that may be used to maximize the complete data likelihood function is the expectation-maximization (EM) approach. This approach alternates performs two steps: the expectation step estimates the unobserved data using the current values of the probability parameters, and the maximization step calculates updated values of the probability parameters that maximize the complete data likelihood function. The approach begins by making initial guesses for A and Γ (e.g. setting them all to unity). The two steps are then iteratively repeated until A and Γ converge.

In the expectation step, the conditional expected values of the unobserved data from the observed data and current estimates of the success probabilities. Closed-form formulas do not exist for these conditional expected values, but they can be computed algorithmically. Using an efficient algorithm such as an upward-downward probability propagation (or "message passing") algorithm, such as that disclosed in B. Frey, *Graphical Models for Machine Learning and Digital Communication*, MIT Press, Cambridge, 1998, the expectation step can be computed in $O(N)$ to $O(N^2)$ operations (depending on network topology), where N is the total number of nodes in the network.

In the maximization step, both the observed and unobserved data are used to calculate the values of A and Γ that maximize the complete likelihood function. Since the complete data likelihood function factorizes into a product of univariate functions, each parameter can be maximized independently using a closed-form analytic expression. Consequently, computation of this step can be done in $O(N)$ operations.

It can be shown that the original (observed data only) likelihood function is monotonically increased at each iteration of the algorithm, and the algorithm converges to a local maximum of the likelihood function. If convergence is defined to occur when none of the unconditional success rates $\alpha_k$ changes by more than 0.001, then convergence typically occurs in a small number of iterations (i.e. 15–50 iterations).

Simulation Results

Figure 5:
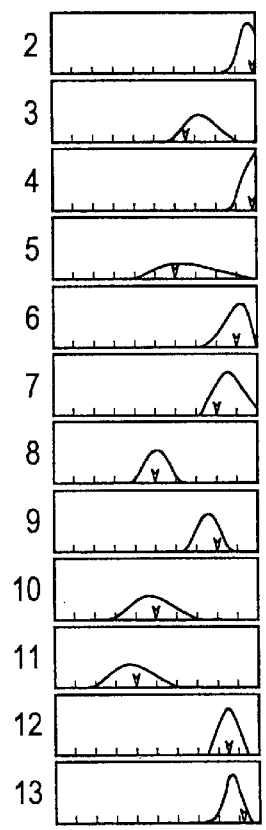
FIG. 5 shows simulation results for the network of FIG. 3.

FIG. 5 shows illustrative output results from software package 402. These results are determined from simulation using the network shown in FIG. 3. The factor graph and marginal analysis approach was used to determine a pmf (probability mass function) for the unconditional success probabilities $\alpha_i$. Accordingly, each of the graphs in FIG. 5 is the pmf corresponding to the indicated link. The vertical axis ranges from zero to one, and the horizontal axis ranges from 0% to 100%. The arrows indicate the true unconditional success probabilities $\alpha_i$.

The network simulation was performed in the following manner. Each link in the network was allowed to assume one of two state values, 0 (representing congestion) and 1 (representing light traffic). At each time instant t, the state of each link was updated according to a Markov process. The transition probability matrix of the process governing the link state was determined by drawing $\alpha_i$ from a uniform distribution U[0,1], and then drawing $\beta_i$ from U[$\alpha_i$,1]. The matrix was designed so that if traffic were sent across the link, it would experience a steady-state success probability of $\alpha_i$, and a conditional success probability $\beta_i$. Packet pair probes were sent to the various receivers in an ordered fashion designed to extract an informative subset of the possible $m_{i,j}$ and $n_{i,j}$. The times at which the first packets were sent were determined from a Poisson process, such that the inter-arrival times were well-separated. The second packet was sent one time instant later. 1600 packet pairs were sent through the network, with the destinations designed so that there was a uniform distribution across the network of divergence nodes.

The pmfs shown in FIG. 5 demonstrate the confidence that can be placed in each estimate. This confidence is clearly dependent on the amount of data that can be collected. Estimation of the success probabilities for links 5, 10 and 11, is based on packet pairs that travel from across links 10 and 11, both of which are very lossy paths.

Grouping

Figure 6:
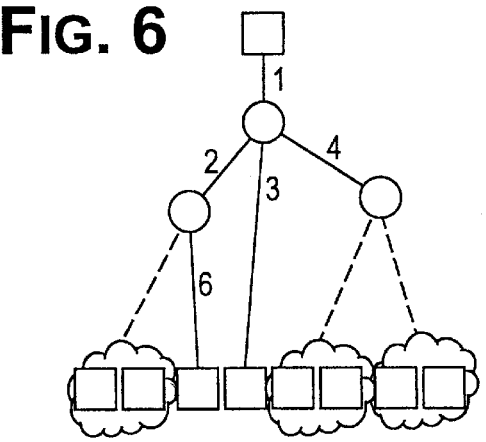
FIG. 6 illustrates a grouping technique for isolating links of particular interest.

In situations where the size of the network limits the ability of the sender software 402 to gather enough information for accurate estimation, a grouping technique may be used to reduce the number of divergence nodes. This is particularly useful if just the performance of the topmost links is of interest. FIG. 6 shows a reduction of the number of divergence nodes and links achieved by grouping various receivers together and treating them as a single receiver.

Process Formulation for Delay Measurement

In addition to packet loss statistics, the packet pair concept can be used to infer communication delays on each of the network links. Suppose two closely time-spaced (back-to-back) packets are sent from the source to two different receivers. The paths to these receivers traverse a common set of links, but at some point the two paths diverge (as the tree branches). The two packets should experience approximately the same delay on each shared link in their path. This facilitates the resolution of the delays on each link.

In the following, we distinguish between a "measurement" period and an "inference" period. The measurement period is the time period over which all measurements are collected. The inference period is some time window within the measurement period; the window duration is dictated by the degree of network stationarity and only the measurements collected in this window are used to perform inference. In order to achieve estimates over the entire measurement period, multiple inferences are performed using different, potentially overlapping inference windows.

The source software 402 collects measurements of the end-to-end delays from source to receivers, and indexes the packet pair measurements by k=1, . . . ,N. For the k-th packet pair measurement, let $y_1(k)$ and $y_2(k)$ denote the two end-to-end delays measured. The ordering is arbitrary; the delay indices are randomly selected with no dependence the order in which the packets were sent from the source. This aids in dealing with discrepancies between the delays experienced by the two packets on shared links, because the random ordering will cause the averaged discrepancy to be zero.

In characterizing network delays, packet pairs in which either of the packets is lost are preferably discarded. However, it is possible to extend this approach to include losses by allocating an "infinite delay" category for lost packets.

Since we are interested in inferring queuing delay, the first step is to identify the minimum delay (propagation+ transmission) on each measurement path. This is estimated as the smallest delay measurement acquired on the path during the measurement period.

Our goal is a nonparametric estimate of the delay distributions on each link. Clearly it is impossible to completely determine an infinite dimensional density function from a finite number of delay measurements, but we require that as the number of delay measurements increases so does the accuracy of our estimation procedure. Thus, we adopt the following procedure. The end-to-end delay measurements are binned, but the number of bins is chosen to be equal to or greater than the number of delay measurements. In practice we choose the number of bins to be the smallest power of two greater than or equal to the number of measurements (facilitating certain processing steps to be described later). We upper bound the maximum delay on any one link by the maximum end-to-end delay along the path(s) that include that link. Let $d_{max}$ denote this upper bound for a particular link and let K be the smallest power of 2 that is greater than or equal to the number of measurement packets N. The bin width for the link is then set at $d_{max}/K$.

This procedure is conservative, in that the estimated $d_{max}$ may be substantially larger than the true maximum queuing delay. It may be preferable to use previous link-delay estimates or bandwidth estimates from a separate procedure to gauge the maximum delay on any link.

At this stage, each end-to-end measurement has been ascribed a discrete number between 0 and L (K−1), where L is the maximum path length in the network.

There are several assumptions in the framework that are worthy of discussion. Firstly, we assume spatial independence of delay. Delay on neighboring links is generally correlated to a greater or lesser extent depending on the amount of shared traffic. In simulation experiments, correlation of delays has been observed. In the presence of weak correlation, our framework is able to derive good estimates of the delay distributions. As the correlation grows stronger, we see a gradual increase of bias in the estimates. We also assume temporal independence (successive probes across the same link experience independent delays). Temporal dependence was observed in our experiments. The maximum likelihood estimator we employ remains consistent in the presence of temporal dependence, but the convergence rate slows. It does not have a dramatic effect on the performance of the estimator.

We do not necessarily require that clocks at the source and receivers be synchronized, but we do require that the disparity between clocks remain very nearly constant over the measurement period. In this way we can be sure that subtracting the estimated minimum delay does not induce bias in our estimates. A further difficulty lies in clock resolution. Clocks must be able to resolve delay sufficiently accurately that the potential error does not overwhelm the true delay value. Deployment of Global Positioning System (GPS) devices allows these clock difficulties to be avoided, as it provides synchronized measurements to within tenths of microseconds. Alternatively, delay measurements can be made using software clocks that have algorithms for enhanced accuracy. Hereafter, we assume that synchronized measurements are available.

Delay Model

Let $p_i=\{p_{i,0},\ldots,p_{i,K-1}\}$ denote the probabilities of a delay of $0,\ldots,K-1$ time units, respectively, on link i. We denote the packet pair measurements $y=\{y_1(k),y_2(k)|k=1,\ldots,N\}$.

In general, only a relatively small amount of data can be collected over the period when delay distributions can be assumed approximately stationary. A natural estimate would be the maximum likelihood estimates (MLEs) of $p=\{p_i\}$, the collection of all delay pmfs. However, when using a number of bins that is equal to or larger than the number of measurements, the problem is ill-posed and the MLE tends to overfit to the probe data, producing highly variable estimates that do not accurately reflect the delay distribution of the traffic at large. High variance manifests itself in irregular, noisy-looking estimates. One way to reduce this irregularity is to maximize a penalized likelihood. We replace the maximum (log) likelihood objective function $L(p)=\log l(y|p)$ with an objective function of the form:

$$L(p)-\text{pen}(p)$$

where pen(p) is a non-negative real-valued functional that penalizes the "roughness" (complexity) of p. A small value of pen(p) indicates that p is a smooth (simple) estimate; a large value indicates that p is rough (complicated). The maximization of this penalized log-likelihood involves a trade-off between fidelity to the data (large L(p)) and smoothness or simplicity (small pen(p)). We will describe a specific choice of penalty function further below. Before moving to that, however, we will quickly formulate the basic likelihood function and motivate the adoption of an EM algorithm for optimization.

Under the assumption of spatial independence, the likelihood of each delay measurement $\{y_1(k),y_2(k)\}$ is parameterized by a convolution of the pmfs in the path from the source to receiver. With our modeling constraint that packets in a pair experience the same delay on shared links, the likelihood of the two measurements made by the k-th packet pair is:

$$l(y_1(k),y_2(k)\mid p)=\sum_j \rho_{c,k}(j)\rho_{1,k}(y_1(k)-j)\rho_{2,k}(y_2(k)-j).$$

In this convolution-type sum, the range of the summation is determined by the ranges of the pmfs $\rho_{c,k}$, $\rho_{1,k}$, and $\rho_{2,k}$. The pmf $\rho_{c,k}$ is the convolution of the pmfs of the links on the common path shared by the two packets, e.g. $\rho_{c,k}=p_1*p_2$ for a receiver 1–2 packet pair in FIG. 2 (with * denoting convolution). The $\rho_{1,k}$ is the convolution of the pmfs on the links traversed only by the packet that measures $y_1(k)$, and similarly $\rho_{2,k}$ for $y_2(k)$. The joint likelihood $l(y|p)$ of all measurements is equal to a product of the individual likelihoods:

$$l(y\mid p)=\prod_{k=1}^{N}l(y_1(k),y_1(k)\mid p)$$

Algorithm Development for Delay Estimation

The presence of convolved link pmfs in the likelihood of each measurement results in an objective function that cannot be maximized analytically. The maximization of the likelihood function requires numerical optimization, and an EM algorithm is an attractive strategy for this purpose. Before giving the details of the algorithm, we briefly review the MMPLE nonparametric density estimation procedure employed in our framework.

Here we briefly outline the MMPLE density estimation procedure developed in E. Kolaczyk and R. Nowak, "A multiresolution analysis for likelihoods: Theory and methods," submitted to *Annals of Statistics*, 2000. To introduce the idea, we consider a case where the link delays have been directly measured (we will handle the tomographic case using the EM algorithm outlined in the next section). Let $z_i(k)$, $k=1,\ldots,N_i$, denote a set of delay measurements for a particular link i. We assume that these measurements are independent and identically distributed according to a continuous delay density p(t), where without loss of generality we assume that $t\in[0,1]$ (for convenience of exposition we take the maximum delay to be unity). Define a discrete pmf via $$p_{i,j}=\int_{(j)/K}^{(j+1)/K}p(t)dt,\ j=0,\ldots,K-1,$$

where K is the smallest power of two greater than or equal to $N_i$. It follows that the number of measurements falling in the interval $$\left[\frac{j}{K},\frac{j+1}{K}\right],$$

denoted $m_{i,j}$, is multinomially distributed, i.e., $\{m_{i,j}\}\sim\text{Multinomial}(N_i;\{p_{i,j}\})$. The MMPLE estimator maximizes the following criterion with respect to $\{p_{i,j}\}$:

$$\log \text{Multinomial}(N_i;\{p_{ij}\})-\text{pen}(\{p_{ij}\}),$$

where $$\text{pen}(\{p_{i,j}\})\equiv\frac{1}{2}\log(N)\times\#_i,$$

where $\#_i$ is the number of non-zero coefficients in the discrete Haar wavelet transform of the pmf $\{p_{ij}\}$. This number reflects the irregularity and complexity of the pmf - - - the larger the value of $\#_i$, the more "bumps" in the pmf. There are two important features of the MMPLE: (1) the global maximizer can be computed in O(K) operations; (2) the MMPLE is nearly minimax optimal in the rate of convergence over a broad class of function spaces. The optimization is carried out by performing a set of K independent generalized likelihood ratio tests. We use a translation-invariant version of the MMPLE, in which multiple MMPLEs are computed with K different shifted versions of the Haar wavelet basis and the resulting estimates are averaged. This produces a slight improvement over the basic MMPLE and can be efficiently computed in O(K log K) operations.

The MMPLE methodology can be employed in the tomographic delay estimation case by simply adopting the penalized likelihood criterion:

$$\log l(y, p) - \sum_i \frac{1}{2}\log(N_i) \times \#_i$$

where $N_i$ denotes the number probe packets passing through link i and $\#_l$ denotes the number of non-zero Haar wavelet coefficients in the delay pmf of link i. The difficulty is that this penalized likelihood function cannot be maximized by a simple set of likelihood ratio tests due to the nonlinear relationship between link delay pmfs and end-to-end measurements y. The EM algorithm is an iterative procedure designed to maximize the penalized likelihood criterion and that takes advantage of the O(K) computational simplicity of the MMPLE technique.

The first step in developing an EM algorithm is to propose a suitable complete data quantity that simplifies the likelihood function. Let $z_i(k)$ denote the delay on link i for the packets in the k-th pair. Let $z_i=\{z_i(k)\}$ and $z=\{z_i\}$. The link delays z are not observed, and hence z is called the unobserved data. Define the complete data $x=\{y, z\}$. Note that the complete data likelihood may be factorized as follows:

$$l(x|p)=f(y|z)g(z|p),$$

where f is the conditional pmf of y given z (which is a point mass function since z determines y), and g is the likelihood of z. The factorization shows that $l(x|p)$ is proportional to $g(z|p)$, since $f(y|z)$ does not depend on the parameters p. Next note that the likelihood $$g(z \mid p) = \prod_{i,j} p_{i,j}^{m_{i,j}}$$

where $m_{i,j} \equiv \sum_{k=1}^{N} 1_{z_i(k)=1}$ is the number of packets (out of all the packet pair measurements) that experienced a delay of j on link i; here $1_A$ denotes the indicator function of the event A. Therefore, we have $$l(x \mid p) \propto \prod_{i,j} p_{i,j}^{m_{i,j}}.$$

Therefore, if the $m_{ij}$ were available, then the MLE of $p_{ij}$ would be simply $$\hat{p}_{i,j} = \frac{m_{i,j}}{\sum_{k=0}^{K-1} m_{i,k}}. \quad (1)$$

Similarly, given the $m_{ij}$ we could directly apply the MMPLE described above.

The EM algorithm is an iterative method that uses the complete data likelihood function to maximize the log-likelihood function. By suitable modification, it can maximize a penalized log-likelihood objective function instead. Specifically, the modified EM algorithm alternates between computing the conditional expectation of the complete data log likelihood given the observations y and maximizing the sum of this expectation and the imposed complexity penalty (−pen(p)) with respect to p. Notice that the complete data log likelihood is linear in m:

$$l(x \mid p) \propto \prod_{i,j} m_{i,j} \log p_{i,j}.$$

Thus, in the E-Step we need only compute the expectation of $m=\{m_{ij}\}$.

E-Step

Let $p^{(r)}$ denote the value of p after the r-th iteration. Then $$\hat{m}_{i,j}^{(r)} \equiv E_{p^{(r)}}[m_{i,j} \mid y] \quad (2)$$

$$= E_{p^{(r)}}\left[\sum_{k=1}^{N} 1_{[z_i(k)=j]} \mid y\right]$$

$$= \sum_{k=1}^{N} E_{p^{(r)}}[1_{[z_i(k)=j]} \mid y]$$

$$= \sum_{k=1}^{N} E_{p^{(r)}}[1_{[z_i(k)=j]} \mid y_1(k), y_2(k)]$$

$$= \sum_{k=1}^{N} p^{(r)}(z_i(k) = j \mid y_1(k), y_2(k))$$

Thus, the conditional expectation of m can be computed by determining the conditional probabilities above for each packet pair measurement.

M-Step

In the penalized case (penalized likelihood criterion), apply the MMPLE algorithm to the conditional expectation $\{\hat{m}_{i,j}^{(r)}\}$. For unpenalized maximum likelihood estimation, simply substitute $\hat{m}_{i,j}^{(r)}$ in place of $m_{ij}$ in equation (1).

Fast Fourier Transform Based EM Algorithm

The expectation step of the EM algorithm poses the major portion of the computational burden of the optimization task. It can be performed using a message passing (or upward-downward) procedure. Unfortunately, a straightforward implementation of the message passing procedure, has a computational complexity which is $O(MK^3)$, where M is the number of links in the tree and K is the number of bins. This may be impractical in our nonparametric setting since K is not fixed, but rather increases in proportion to the number of measurements. In this section, we describe a novel, fast Fourier transform based implementation which is $O(MK^2 \log K)$, a tremendous reduction in complexity when K is large.

The message passing procedure is based on a factorization of the likelihood function, which can be represented graphically using a factor graph. According to (2), our task for each measurement in the r-th iteration of the EM algorithm is to compute $p^{(r)}(z_i=j|y_1, y_2)$ (we have dropped the measurement index k for clarity). In J. Pearl, "Fusion, propagation, and structuring in belief networks," *Artificial Intelligence*, vol. 29, pp. 245–57, 1986, an exact probability propagation algorithm is disclosed for inferring the distributions of individual variables in singly-connected graphical models. The basic idea of the algorithm is that each node in the graph propagates its information (a measurement or current pmf estimate in this case) to every other node. Each node then combines all the messages it receives to compute the distribution of its variable.

Figure 9:
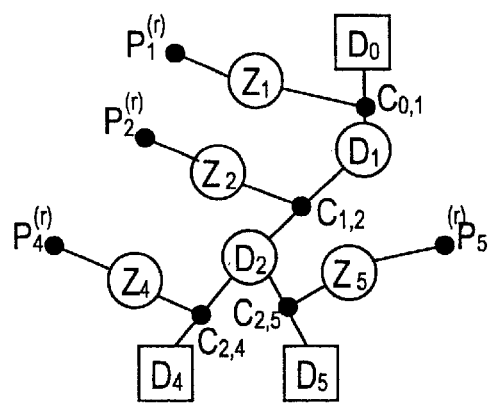
FIG. 9 shows a pmf factor graph for delay estimation in the network of FIG. 2.

We illustrate the procedure for a packet pair measurement to receivers 1 and 2 of the network in FIG. 2. For this scenario, the factor graph representation is depicted in FIG. 9. The hollow nodes of the graph represent variables (the link delays $\{z_i\}$ and the cumulative delays $\{d_i\}$ at links 0, 1, 2, 4 and 5. The small nodes represent functions—these either indicate functional relationships between variable nodes or carry prior information. In this case, the nodes labeled $p_i^{(r)}$ carry the current pmf estimates and nodes $c_{ij}$ represent convolution operators. For example, node $c_{1,2}$ indicates that the accumulated delay pmf at node $d_1$ is convolved with the link delay pmf $z_2$ to obtain the accumulated delay pmf at node $d_2$.

The message passing algorithm can be divided into two sections. In the "upward" stage, all information available at the leaves of the tree is passed up the tree towards the root. In the "downward" stage, the information at the root is passed down to the leaves. In this case, the leaf information includes the measurements and the current pmf estimates. The root information is simply the knowledge that $d_0=0$. We use the notation $\mu(a \rightarrow b)$ to represent the message that is passed from node a to node b in the graph; each message takes the form of a pmf. We now provide a brief outline of the messages generated and how they are combined and distributed.

Up-Step
1. For i=1,2,4,5, the message $\mu(p_i^{(r)} \rightarrow z_i)$ is simply the current (r-th iteration) link i pmf estimate.
2. $\mu(d_4 \rightarrow c_{2,4})$ is a pmf with mass 1 at bin $y_1$ (the delay measured at node 4).
3. $\mu(d_5 \rightarrow c_{2,5})$ is a pmf with mass 1 at bin $y_2$ (the delay measured at node 5).
4. $\mu(z_4 \rightarrow c_{2,4}) = \mu(p_4^{(r)} \rightarrow z_4)$.
5. $\mu(z_5 \rightarrow c_{2,5}) = \mu(p_5^{(r)} \rightarrow z_5)$.
6. Node $c_{2,4}$ combines its incoming messages according to its convolution function to pass on a message to node $d_2$; the entry in the j-th bin of the message (a pmf) is $$\mu(c_{2,4} \rightarrow d_2)(j) = p^{(r)}(z_4 = y_{1-j}).$$

7. $\mu(c_{2,5} \rightarrow d_2)(j) = p^{(r)}(z_5 = y_{2-j})$.
8. Node $d_2$ combines the incoming messages by multiplying them together:

$$\mu(d_2 \rightarrow c_{1,2})(j) = \mu(c_{2,4} \rightarrow d_2)(j) \times \mu(c_{2,5} \rightarrow d_2)(j).$$

9. According to the convolution function at $c_{1,2}$, the message $\mu(c_{1,2} \rightarrow d_1)(j)$ is:

$$\mu(c_{1,2} \rightarrow d_1)(j) = \Sigma_{k \geq j} p^{(r)}(z_2 = k-j)\mu(d_2 \rightarrow c_{1,2})(k)$$

10. $\mu(d_1 \rightarrow c_{0,1})(j) = \mu(c_{1,2} \rightarrow d_1)(j)$.

Down-Step
1. The message $\mu(d_0 \rightarrow c_{0,1})$ is a pmf with mass only at 0.
2. The message from $c_{0,1}$ to $z_1$ combines the upward and downward messages entering $c_{0,1}$ according to the convolutional rule. $\mu(c_{0,1} \rightarrow z_1)(j) = \Sigma_{k \geq j} \mu(c_{0,1} \rightarrow z_1)(j) \times \mu(d_2 \rightarrow c_{0,1})(j-k)$.
3. Continue in a similar fashion down the tree.

At each variable node $z_i$, the incoming messages are multiplied together to calculate the local distributions for the delay pmf variables. For example, multiplying the two messages flowing into node $z_1$ together gives $p^{(r)}(z_1=j|y_1, y_2) = \mu(c_{0,1} \rightarrow z_1)(j) \times \mu(p_1^{(r)} \rightarrow z_1)(j)$.

It is the summations in steps Up-9 and Down-2 that introduce the complexity of $O(K^2)$. We avoid this $O(K^2)$ computation by noting that messages involving such summation can be written as a convolutions provided we first time-reverse one of the pmfs involved. By time-reversal, we mean that $\tilde{p}^{(r)}(z_i=j) = p^{(r)}(z_i=K-1-j)$ where denotes time-reversal. For example, we can write:

$$\mu(c_{1,2} \rightarrow d_1)(j) = [\mu(d_2 \rightarrow c_{1,2}) * \tilde{p}^{(r)}(z_2)](K-1-j). \quad (3)$$

By taking Fourier transforms, the convolution can be implemented as a product in the Fourier domain, reducing the computational complexity to $O(MK \log K)$ per observation.

The $K^2$ factor in the complexity dominates the other terms. However, further computational savings can be introduced by exploiting the additive nature of the Fourier transform. This has the effect of replacing the $K^2$ factor by $(K/M_{int})^2$, where $M_{int}$ is the number of internal nodes in the network. The computational savings can be a substantial.

Measurement of Nonstationary Network Parameters

In this section, we propose a sequential Monte Carlo (SMC) procedure capable of tracking nonstationary network behavior and estimating time-varying, internal delay characteristics. (Topology changes are not addressed by this procedure.) This methodology is based on sequential importance sampling that not only addresses the basic (stationary) network tomography problem, but also directly tackles the more challenging and realistic problem of tracking time-varying network delay behavior. A stochastic model of the network dynamics is provided below. The available observations are a highly non-linear function of the system. As a result, the extended Kalman filter is not suitable for the task. The EM algorithm also assumes the network is stationary and does not account for temporal variations.

We collect measurements of the end-to-end delays from source to receivers, and we index the packet pair measurements by m=1, . . . ,M. For the m-th packet pair measurement, let $y_1(m)$ and $y_2(m)$ denote the two end-to-end delays measured. The delays are quantized such that the quantized delay on each link falls in the range 0,1, . . . ,K time units.

To describe our observation model, let us first consider the case of a stationary network in which the delay characteristics are not time-varying. Associated with each individual link/router in the network is a probability mass function (pmf) for the queuing delay. Let $p_i = \{p_{i,0}, \ldots, p_{i,K}\}$ denote the probabilities of a delay of 0, . . . ,K time units, respectively, on link i. Given the packet pair measurements $y \equiv \{y_1(m), y_2(m)\}$, we are interested in maximum likelihood estimates (MLEs) of $p \equiv \{p_i\}$, the collection of all delay pmfs. The likelihood of each delay measurement is parameterized by a convolution of the pmfs in the path from the source to receiver. The coupling of the pmfs of each link results in a likelihood function that cannot be maximized analytically. The joint likelihood $l(y|p)$ of all measurements is equal to a product of the individual likelihoods. The maximization of the joint likelihood function requires numerical optimization, and the EM algorithm is an attractive strategy for this purpose.

In nonstationary networks, the queuing behavior varies over time, and the notion of a delay distribution is not well defined. Nonetheless, time functions such as the expected delays across each link are very much of interest. To put such notions on firmer ground, we define the time-varying delay distribution of window size R at measurement m as:

$$p_{i,j}(R, m) = \frac{1}{R} \sum_{l=m-R+1}^{m} 1_{\{z_i(l)=j\}}, \quad (4)$$

with $z_i(l)$ being the (unobserved) delay experienced at queue i by measurement packets l and $1_{\{z_i(l)=j\}}$ is the indicator function for the event $\{z_i(l)=j\}$. Let $p_{i,R} \equiv \{p_{ij}(R,m)\}$ denote the time-varying probabilities of a delay on link i. The choice of the window size R is a classic instance of the trade-offs involved in data windowing; smaller windows provide increased time resolution (smaller bias) at the expense of increased estimator variance. In practice, R may be selected on the basis of known or assumed dynamics of the network.

A Dynamical Model for Nonstationary Communication Networks

We now consider the problem of modeling time-varying delay distributions as defined in (4). We propose a relatively simple parametric family of dynamical distributions to describe the queuing delay distributions of individual network links. The models are sufficiently general to capture a variety of potential network conditions. The models play the role of prior probability distributions in our SMC framework. In that context, the prior is a mixture (or superposition) of a variety of the elementary models (distinguished by different parameter settings). The basic idea is that, although no single model and parameter setting may accurately describe the complex queuing behavior of actual networks, mixtures of many such models with diverse parameter settings may be sufficient to capture the true behavior. In the SMC algorithm, the mixing of the models is a function of the actual network measurements; this is a key strength of the approach which allows us to use previous measurements to improve the MC sampling in subsequent steps of the dynamical estimation procedure. The SMC algorithm is described in the next section. We now propose the parametric family of dynamical models underlying the prior distribution of the algorithm.

The queuing delay experienced by a measurement packet on each link in the network is due to other packets in the queue(s) of the associated router(s). The most elementary model for queuing delay distributions is derived the classical M/M/1/K queue model. This model will serve as a motivation for the building block of our prior (mixture) distribution. In addition to M/M/1/K queuing, we assume a network in which each link is a direct connection between two routers and associate the delay on each link with a dedicated output queue at the router from which it emerges (i.e. each outgoing link has its own dedicated queue). Each of these queues has a buffer size K with Markovian services at rate $\mu$. Coupled with a homogeneous (constant rate $\lambda$) Poisson arrival process, this model is the standard M/M/1/K queue model. In extending this to heterogeneous networks (differing service rates and queue sizes), we assume that we make measurements (send packet-pairs) at a rate of $C_1 \mu K$ where $C_1 > 1$ is a constant. This ensures that there is sufficient time for the queues to relax between measurements, resulting in approximately statistically independent measurements.

Now, in the nonstationary setting, the most simple approach is to adopt a model in which packet arrivals at a given queue are governed by a time-varying (inhomogeneous) Poisson arrival process. We will also assume that the bandwidth B of this process is limited such that $$B < \frac{1}{2C_1 \mu K} \quad (5)$$

This implies a quasi-stationarity; the dynamics of the system are evolving at a rate slow enough that we can discretize at the measurement rate (specifically where the measurements are made) and study the discretized system. Moreover, each measurement essentially encounters a classical M/M/1/K queue. We complete our model by imposing a random walk structure on the log-intensity of the traffic arrivals:

$$\log \lambda_l(m+1) = \log \lambda_l(m) + \epsilon(m), \quad (6)$$

where m denotes the m-th measurement, and $\epsilon(m)$ is zero-mean Gaussian noise of variance $\sigma_l^2(m)$. The random walk is not meant to accurately portray the actual traffic dynamics, rather it is simply a device which allows our SMC procedure to track potential time-varying behavior and enforces smoothness in the evolution of the delay distributions (which is reasonable and desirable based on the physical nature of network queues). We set all the variances $\sigma_l^2(m)=1$ in advance (as a basic parameter of the SMC algorithm), although it is possible to extend our framework to treat the variances as additional unknown parameters also to be tracked.

The model described thus far induces delay pmfs at each measurement time of the form $$p_{i,j}(m) \propto \sigma_i^j(m) \quad (7)$$

where the parameter $\sigma_i(m)$ is the ratio of the arrival rate $\lambda_i(m)$ and service rate on the i-th link. Such pmfs are exponentially increasing or decreasing, for $\sigma_i(m)>1$ and $\sigma_i(m)<1$, respectively. This implies that the mode is either at delay 0 or delay K.

In real networks, however, the delay pmfs can display modes at other points due to the non-Poissonian nature of traffic and due to the fact that each link may include multiple "hidden" routers. To account for such modes we propose the following extension of the M/M/1/K type model. We introduce an additional dynamical (continuous) parameter $\kappa_l$ for each link and define the delay pmf as $$p_{i,j}(m) \propto \sigma_i^{|j-\kappa_i|} \quad (8)$$

which places the mode of the pmf near $\kappa_i$. The (unknown) parameter $\kappa_l$ also evolves according to a continuous random walk (variance of 1 with reflection at 0 and K to ensure smoothness in the evolution of the delay distributions). The model above (8) will serve as our basic building block; the prior distribution employed in our SMC procedure is a mixture of pmfs of this form. If we choose K+1 distinct values for i, then the resulting vectors $p_i = [p_{i,0}, \ldots, p_{i,K}]$ are linearly independent, thus forming a basis for $\mathbb{R}^{L+1}$. Therefore, any pmf can be represented as a linear combination of these vectors.

To summarize, we have proposed a parametric family of dynamical models to describe the queuing delay distributions of network links. All parameters of this model, K, $\mu$, $\lambda_l$, are unknowns in our framework (the SMC algorithm will employ many different settings of parameters to obtain a reasonably dense sampling of the parameter space). The models are sufficiently general to capture a variety of potential network conditions. The prior distribution of our SMC procedure, described next, is a mixture (or superposition) of these basic parametric models. As demonstrated above, such mixtures are capable of representing all possible delay distributions. Moreover, the priors on the dynamics of our framework (random walks) and associated parameters (variances of random walks) are fairly noninformative, ensuring that the SMC procedure is mostly influenced by the data themselves and is not strongly affected by our modeling assumptions.

Sequential Monte Carlo Tracking of Time-Variation: Algorithm Development

We would like to track the internal delay distributions over time. More specifically, based on our measurements we wish to estimate the time-varying delay distribution defined in (4). We will focus on the posterior mean as our estimator. The posterior mean is simply the mean of the posterior density, which is proportional to the likelihood function of measurements multiplied by the prior distribution placed on the delay pmfs. The prior we employ here is a mixture of time-varying pmfs of the form (5). The mixing function is determined by the dynamical structure of each time-varying pmf, as governed by the random walks described in the previous section.

The posterior mean estimate of $p_{i,j}(R,m)$ can be written as:

$$\hat{p}_{i,j}(R,m) \equiv E_{p(z_{m-R+1:m}|y_{1:m})}\left[\sum_{l=m-R+1}^{m} 1_{\{z_i(l)=j\}}\right] \quad (9)$$

$$= \frac{1}{R}\sum_{l=m-R+1}^{m} p(z_i(l) \mid y_{1:m})$$

$$= \frac{1}{R}\sum_{l=m-R+1}^{m} \int p(z_i(l) = j \mid y(l), \lambda_l) p(\lambda_l \mid y_{1:m}) d\lambda_l$$

where $y(l) \equiv [y_1(l), y_2(l)]$, $\lambda_l$ is a vector composed of the traffic intensities on all links at time l, and $y_{1:m}$ is a vector composed of the measurements at times 1, ... , m. As before $z_i(l)$ is the (unobserved) delay on link i at time l, and $z_{m-R+1} \equiv [z_l(m-R+1), \ldots, z_l(m)]$.

The evaluation of this estimator is difficult. It requires an integration over the density $p(\lambda_l | y_{1\,m})$, which cannot be solved analytically. We adopt numerical integration techniques. Moreover, we calculate the estimate at each time m. It is important that we form our estimate $\hat{p}_{i,j}(R,m)$ without redoing all the calculations involved in generating the estimate at time m−1. Otherwise we are not only wasting considerable computations, but we render a real-time implementation of our procedure impractical. These considerations motivate the adoption of a sequential algorithm.

In the dynamic model, the available observations $y_{l:m}$ are a highly non-linear function of the evolving parameters $\lambda_{0,m}$. Standard sequential tracking methods such as the Kalman filter are not applicable; our attempts at linearization (e.g., the extended Kalman filter) also result in very poor tracking.

We begin by briefly outlining the Monte Carlo nature of the technique. Because the integral in (9) can not be calculated analytically, we approximate the estimator using Monte Carlo integration. To do this, we must sample from $p(\lambda_l | y_{1:m})$, which itself is not easily accomplished. An alternative approach is to perform "importance" sampling. Let $\lambda_{0:m}$ denote the trajectories of the traffic intensities on all links over the time interval 0, ... , m. The basic idea here is to generate N draws of $\lambda_{0:m}$ from an importance distribution $\pi_m$, that has the same support as $p(\lambda_{0:m}|y_{1:m})$ but from which we can sample more easily. We wish to sample the entire trajectory $\lambda_{0\cdot m}$ rather than just $\lambda_l$ because the trajectories are highly coupled (evaluating $p(\lambda_l|y_{1:m})$ requires difficult marginalization). Each draw represents an independent sample path of the network's dynamical evolution and thus independently explores part of the sample space. We use these draws (or "particles") to compute the desired Monte Carlo integration as follows. We can re-write the integration as, $$\int p(z_i(l) = j \mid y(l), \lambda_l) \left[\frac{p(\lambda_{0:m} \mid y_{1:m})}{\pi_k(\lambda_{0:m} \mid y_{1:m})}\right] \pi_k(\lambda_{0:m} \mid y_{1:m}) d\lambda_l.$$

Then, the Monte Carlo estimate is $$\sum_{v=1}^{N} p(z_i(l) = j \mid y(l), \lambda_l^{(v)}) \tilde{w}_m^{(v)} \quad (10)$$

where $w_m^{(v)} = p(\lambda_{0:m}^{(v)} | y_{1:m})/\pi(\lambda_{0:m}^{(v)}|y_{1:m})$ and $$\tilde{w}_m^{(v)} = w_m^{(v)}\left[\sum_{s=1}^{N} w_m^{(v)}\right]^{-1}.$$

In order to evaluate this Monte Carlo estimate, we determine both the weight $w_m^{(v)}$ (up to a proportionality constant) and the value of $p(z_i(l)=j|y(l),\lambda_l^{(v)})$ for each of the N particles. We have $p(\lambda_{0:m}^{(v)}|y_{1:m}) \propto p(y_{1:m}|\lambda_{0:m}^{(v)})p(\lambda_{0:m}^{(v)})$. As the measurements are independent, the likelihood in this expression can be decomposed as where each $p(y_{1:m}|\lambda_{0:m}^{(v)}) = \Pi_{l=1:m}p(y(l)|\lambda_l^{(v)})$, where each factor in the product is a convolution of pmfs that can be evaluated efficiently using FFTs. The $p(\lambda_{0:m}^{(v)})$ term can be determined from the dynamics of the system equation (6).

Evaluating $p(z_i(l)=j|y(l),\lambda_l^{(v)})$ involves the application of an upward-downward algorithm. This algorithm propagates the knowledge of (1) the zero delay at the source and (2) the delays y(l) at the two receivers throughout the tree, exploiting the independence of the conditional pmfs to calculate marginal distributions at each node.

Sequential Importance Sampling

The Monte Carlo integration approach described above requires us to generate entire trajectories $\lambda_{0:m}$ at each time m, and then to calculate the associated weight. This is computationally demanding and highly wasteful. At time m, we want to perform the integration without redoing calculations made at time m−1. This is achieved by forming the trajectory $\lambda_{0:m}^{(v)}$, without modifying the previous trajectory $\lambda_{0:m-1}^{(v)}$ which is possible if the importance sampling distribution has a Markovian structure. At time 0, we sample from the initial distribution $\pi_0(\lambda_0)$. At time m, we sample from $\pi_m(\lambda_m|\lambda_{0:m-1}^{(v)},y_{1:m})$, and form the time-m particle v by appending $\lambda_m^{(v)}$ to $\lambda_{0:m-1}^{(v)}$. The weight of particle v at time m can then also be updated recursively:

$$w_m^{(v)} = \tilde{w}_{m-1}^{(v)} \frac{p(y(m)|\lambda_m^{(v)})p(\lambda_m^{(v)}|\lambda_{m-1}^{(v)})}{\pi_m(\lambda_m^{(v)}|\lambda_{0:m-1}^{(v)}, y_{1:m})}.$$

We form our approximate estimator, denoted $\tilde{p}_{i,j}(R,m)$, by replacing the true integrals in (9) by their Monte Carlo approximations (10).

The dynamics of the proposed model involve a random walk of log $\lambda_m$. We employ the prior distribution $p(\lambda_m|\lambda_{m-1})$ as the importance function. In this scenario, we merely calculate the likelihood to determine the update in the weights:

$$w_m^{(v)} = \tilde{w}_{m-1}^{(v)} p(y(m)|\lambda_m^{(v)}) \quad (11)$$

The weight update factor at each time step is the likelihood $p(y(m)|\lambda_m^{(v)})$. This can be efficiently calculated using $2n_m$ FFTs, where $n_m$ is the number of unique links traversed by the two packets involved in the m-th measurement. Since we are dealing with discrete distributions, our weight update factor (11) is bounded above by 1, which implies that at any time m, every importance weight is bounded by 1.

Degeneracy is a major issue in the application of sequential importance sampling. The multiplicative update applied to the weight at each time means that some importance weights may quickly tend to zero, and the number of particles contributing to the estimator is greatly reduced. This effect increases the variability of the estimator (compared to the variance one would have with the full N particles contributing). The procedure of "resampling" aims to generate an unweighted approximation of the weighted particle distribution. When performed at time m, the procedure associates with each particle v a number of offspring $N_m^{(v)}$, such that $$\sum_{v=1}^{N} N_m^{(v)} = N.$$

The procedure thus obtains a new set of particles, each of which has weight 1/N, and ensures that the number of significant weights remains close to N. There are numerous techniques for performing resampling. The most popular is sampling importance resampling (SIR), which involves jointly drawing $\{N_m^{(v)}\}_{v=1}^{N}$ according to a multinomial distribution of parameters N and $\{\tilde{w}_m^{(v)}\}_{v=1}^{N}$. Other techniques include residual resampling, and stratified resampling (described in G.Kitagawa, "Monte Carlo filter and smoother for nonlinear non-Gaussian state space models," *J. Comp. Graph. Statist.*, 5:1–25, 1996), which we adopt.

This resampling process does introduce some additional computational overhead in the formation of our approximate estimator at time m. Technically, it necessitates calculating the marginal smoothing distributions $p(\lambda_l|y_{1:m})$ for $l \in \{m-R+1, \ldots, m\}$. This can be done using the two-filter formula of G.Kitagawa, "Monte Carlo filter and smoother for nonlinear non-Gaussian state space models," *J. Comp. Graph. Statist.*, 5:1–25, 1996, or a forward filtering-backward smoothing of A. Doucet, et al, "On sequential Monte Carlo sampling methods for Bayesian filtering," Statist. Computing, 10:197–208, 2000, or the backwards simulation procedure of S. J. Godsill, et al, "Monte Carlo smoothing for nonlinear time series," Technical report, Institute of Statistics and Decision Sciences, Duke University, 2000.

In simulations, we observe that if we use the approximation (replacing $\tilde{w}_m^{(v)}$ with $\tilde{w}_l^{(v)}$):

$$\sum_{v=1}^{N} p(z_i(l) = j | y(l), \lambda_l^{(v)}) \tilde{w}_l^{(v)} \quad (12)$$

for the summation in (10), then we achieve similar performance. We adopt this approximation in the algorithm we outline below:

Particle Filter for Delay Distribution Estimation

At time 0: For $v=1, \ldots, n$, sample $\lambda_0^{(v)}$ from $p(\lambda_0)$.

At time m:

Sequential Importance Sampling Step

1. For $v=1, \ldots, N$, sample $\lambda_m^{(v)} \sim p(\lambda_m|\lambda_{m-1}^{(v)})$ and set $\lambda_{0:m}^{(v)} \equiv (\lambda_{0:m-1}^{(v)}, \lambda_m^{(v)})$.

2. For $v=1, \ldots, N$, evaluate the importance weights $\tilde{w}_m^{(v)}$:

$$w_m^{(v)} \propto p(y(l)|\lambda_m^{(v)}) \quad (13)$$

$$\tilde{w}_m^{(v)} = w_m^{(v)} \left[\sum_{s=1}^{N} w_m^{(s)}\right]^{-1} \quad (14)$$

Selection Step

3. Apply stratified resampling (see G. Kitagawa, "Monte Carlo filter and smoother for nonlinear non-Gaussian state space models," *J. Comp. Graph. Statist.*, 5:1–25, 1996) to obtain N new particles ($\lambda_{0:m}^{(v)}$; $v=1, \ldots, N$), each with weight 1/N.

Estimation Step

4. For all i,j, evaluate $p(z_i(m)=j|y(m), \lambda_m^{(v)})$ using the upwards-downwards probability propagation algorithm.

5. For all i,j, estimate $\tilde{p}_{i,j}(R,m)$ from:

$$\tilde{p}_{i,j}(R, m) = \frac{1}{R} \sum_{l=m-R+1}^{m} \sum_{v=1}^{N} p(z_i(l) = j | y(l), \lambda_l^{(v)}) \tilde{w}_l^{(v)}$$

Conclusion

The packet-pair measurement procedures disclosed herein allow for the accurate determination of performance information including the loss rates and delay characteristics of individual links in the network (a link is the connection between two routers). In addition, this technique may be used to isolate available link bandwidth and link utilization if link capacities are known. (Various other software tools exist for determining link capacities.)

Among the many advantages of this technique is that is readily applied in many frameworks, including those that provide for passive, nonparametric and time-varying performance characterization. In addition, it requires no cooperation from internal routers nor does it require any modification of existing network protocols. The performance characterization is expected to be of great utility to service providers, system administrators, and end users, because it characterizes the conditions experienced by unicast packets, the most commonly used communication packets. Further, the computational overhead and bandwidth overhead required by the disclosed techniques is quite moderate and it scales well with the size of the network.

Numerous variations and modifications will become apparent to those skilled in the art once the above disclosure is fully appreciated. It is intended that the following claims be interpreted to embrace all such variations and modifications.

What is claimed is:

1. A method that includes:
    sending a set of unicast communications packets from a source through the network, wherein the set of unicast communications packets includes multiple groups of communications packets, wherein the group are separated by at least a predetermined minimum time, wherein the communications packets within the groups are separated by no more than a predetermined maximum time, and wherein the predetermined maximum time is substantially less than the predetermined minimum time;
    receiving from each of multiple receivers receipt information indicating those communications packets which have been successfully received by that receiver; and
    determining a performance characteristic for each of multiple communications links in the network from the receipt information.

2. The method of claim 1, wherein each group is a packet pair separated by less than the maximum time.

3. The method of claim 2, wherein at least one of the packet pairs includes packets going to different receivers.

4. The method of claim 2, wherein at least one of the packet pairs includes packets going to the same receiver.

5. The method of claim 1, wherein the set of unicast communications packets further includes multiple isolated communications packets.

6. The method of claim 5, wherein the isolated communications packets and the groups are separated from other isolated communications packets and groups by at least the predetermined minimum time, wherein the predetermined minimum is large enough to provide approximate statistical independence in packet transmission, and wherein the predetermined maximum time is small enough to provide a very high correlation in packet transmission.

7. The method of claim 5, wherein the performance characteristic is an unconditional packet loss rate.

8. The method of claim 7, wherein said determining a performance characteristic includes:
   computing a conditional packet success rate of packets in the groups for the multiple communications links as part of maximizing a complete data likelihood function to determine the performance characteristic.

9. The method of claim 5, wherein the performance characteristic is an unconditional packet success probability estimate and a confidence measure of the success probability estimate.

10. The method of claim 5, wherein the performance characteristic is average packet delay, and the receipt information indicates an end-to-end travel time of the communications packets.

11. The method of claim 5, wherein the performance characteristic is a packet delay probability mass function, and the receipt information indicates an end-to-end travel time of the communications packets.

12. A method of determining network performance, wherein the method includes:
   sending multiple sets of closely-spaced communications packets from a source through the network to multiple receivers, wherein the packets travel through a set of communications links characterizable as a tree having intermediate nodes between the source and the multiple receivers;
   receiving from each of the multiple receivers receipt information indicating those communications packets which have been successfully received by that receiver;
   determining a performance characteristic for each of the communications from the receipt information; and
   wherein the multiple sets are transmitted in a manner that avoids correlation of performance conditions.

13. The method of claim 12, wherein the closely-spaced communications packets in each set have a conditional packet success rate of substantially unity.

14. A source computer configured to execute network performance determination software, wherein the software comprises:
   a topology component configured to determine a tree structure of network communications paths from the source computer to multiple receivers;
   a probe component configured to create a first log to track a set of unicast communications packets transmitted from the source computer to the multiple receivers;
   a gathering component configured to create a second log to track end-to-end measurement information received from the multiple receivers regarding those communications packets which have been successfully received by the multiple receivers; and
   an estimation component configured to process the first and second logs to determine a performance characteristic for each communications link identified in the tree structure.

15. The computer of claim 14, wherein the set of unicast communications packets consists of multiple isolated packets and multiple back-to-back packet pairs, wherein the isolated packets and packet pairs are separated from other isolated packets and packet pairs by at least a minimum time spacing value between 100 $\mu$s and 100 ms.

16. The computer of claim 14, wherein the performance characteristic is one of a set of characteristics consisting of an unconditional packet loss rate and an average packet delay.

17. The computer of claim 14, wherein the performance measurement is one of a set of characteristics consisting of an unconditional packet success posterior probability density function, and a packet delay probability mass function.

* * * * *